United States Patent [19]

Krenzer

[11] Patent Number: 5,088,243

[45] Date of Patent: Feb. 18, 1992

[54] METHOD OF FORMING THE TEETH OF LONGITUDINALLY CURVED TOOTH GEARS

[75] Inventor: Theodore J. Krenzer, West Rush, N.Y.

[73] Assignee: The Gleason Works, Rochester, N.Y.

[21] Appl. No.: 697,839

[22] Filed: May 9, 1991

Related U.S. Application Data

[63] Continuation-in-part of Ser. No. 563,587, Aug. 6, 1990, abandoned.

[51] Int. Cl.⁵ .............................................. B24B 49/00
[52] U.S. Cl. .................................... 51/287; 51/55; 51/165.77; 51/DIG. 1
[58] Field of Search .............. 51/54, 55, 58, 129, 51/133, 165.71, 165.74, 165.77, 287, DIG. 1

[56] References Cited

U.S. PATENT DOCUMENTS

| | | |
|---|---|---|
| 1,811,254 | 6/1931 | Bayley . |
| 1,815,336 | 7/1931 | Shlesinger et al. . |
| 1,830,971 | 11/1931 | Taylor . |
| 1,982,050 | 11/1934 | Gleason et al. . |
| 2,910,808 | 11/1959 | Wildhaber .................... 51/55 |
| 3,803,767 | 4/1974 | Kotov et al. . |
| 4,765,095 | 8/1988 | Wiener ........................ 51/287 |
| 4,780,990 | 11/1988 | Cody, Jr. et al. ............ 51/52 R |
| 4,799,337 | 1/1989 | Ketthaus ..................... 51/287 |
| 4,815,239 | 3/1989 | Sommer ................... 51/165.77 |
| 4,981,402 | 1/1991 | Krenzer et al. ............ 409/26 |
| 4,991,353 | 2/1991 | Wiener .................... 51/165.77 |

FOREIGN PATENT DOCUMENTS

| | | |
|---|---|---|
| 0022586 | 1/1981 | European Pat. Off. . |
| 0024301 | 3/1981 | European Pat. Off. . |
| 1752941 | 4/1971 | Fed. Rep. of Germany . |
| 2945483 | 5/1981 | Fed. Rep. of Germany . |
| 3333845 | 3/1985 | Fed. Rep. of Germany . |

OTHER PUBLICATIONS

Spear, G. M. et al., "HELIXFORM Bevel and Hypoid Gears", *Journal of Engineering for Power*, Aug. 1960, pp. 179-190.

*Primary Examiner*—M. Rachuba
*Attorney, Agent, or Firm*—Ralph E. Harper; Robert L. McDowell

[57] ABSTRACT

A process of forming the longitudinally curved teeth of bevel and hypoid gears is disclosed. A dish-shaped tool is oscillated relative to a work gear with the oscillating causing the dish-shaped tool to swing through an arc corresponding to the longitudinally curved teeth of the work gear. The inventive process comprises additional motions included in a timed relationship with the oscillating motion of the dish-shaped tool. The included motions are functions of the phase angle of the oscillating dish-shaped tool and the timed relationships are defined by a power series. The process enables improved control of contact patterns of mating gear teeth. The process may be computer numerically controlled. The process is applicable to cutting or grinding processes utilizing, respectively, dish-shaped cutting tools or dish-shaped grinding wheels.

32 Claims, 14 Drawing Sheets

FIG. 5a GEAR - CONVEX
FIG. 5b
FIG. 5c GEAR - CONCAVE
FIG. 5d

GEAR - CONVEX

GEAR - CONCAVE

CONCAVE GEAR

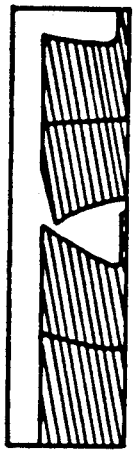
FIG. 9a GEAR-CONVEX
FIG. 9b
FIG. 9c GEAR-CONCAVE
FIG. 9d

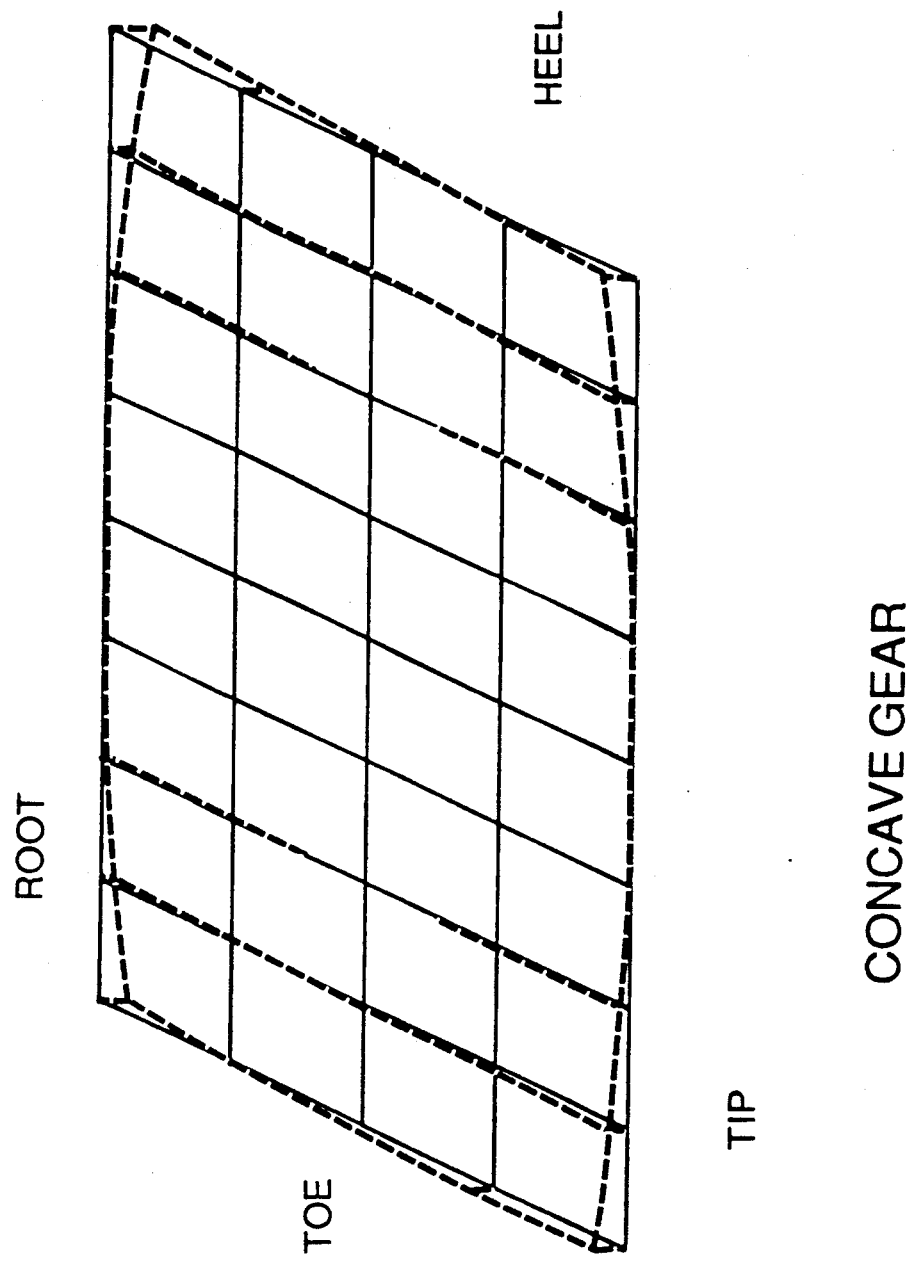
FIG. 11 CONCAVE GEAR

GEAR - CONCAVE

GEAR - CONVEX

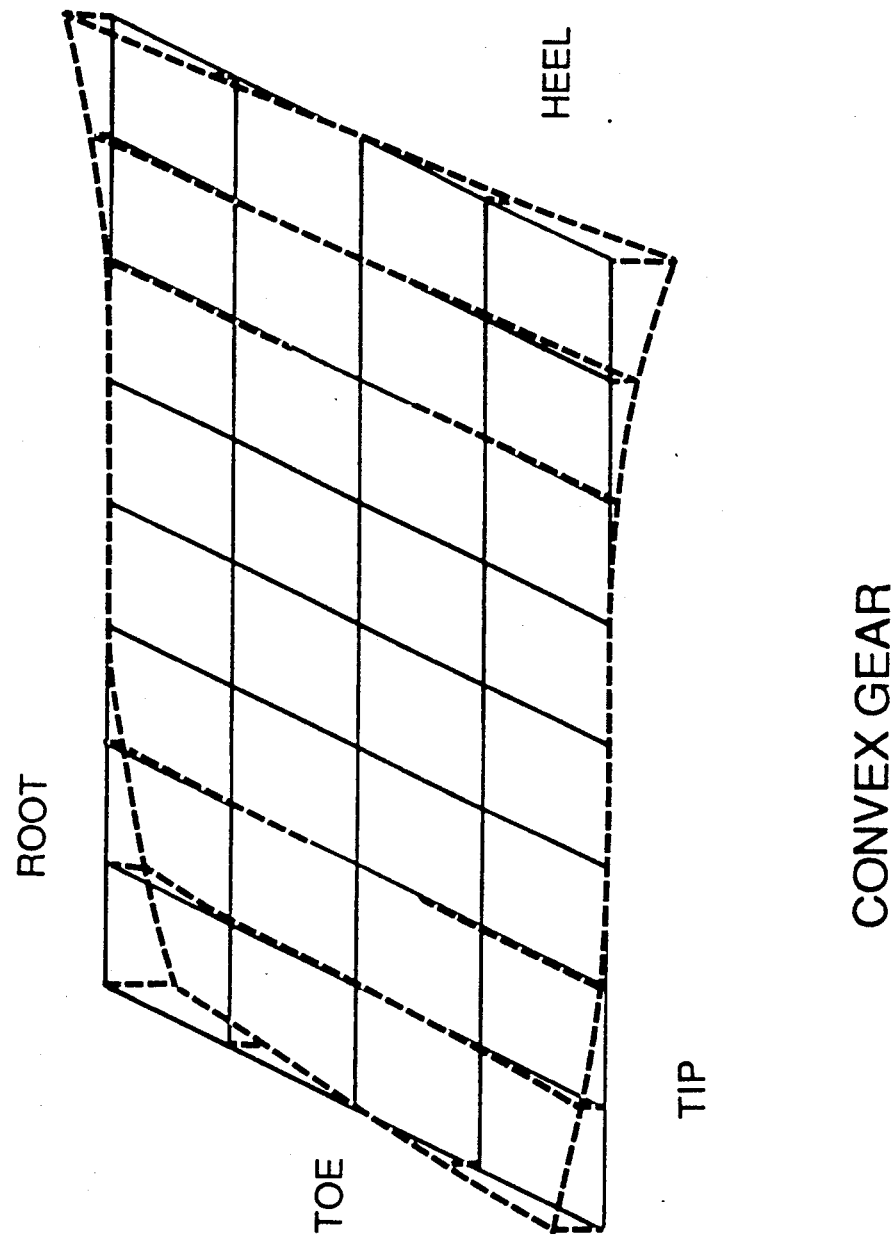
FIG. 13  CONVEX GEAR

CONCAVE GEAR

METHOD OF FORMING THE TEETH OF LONGITUDINALLY CURVED TOOTH GEARS

This is a continuation-in-part of copending application Ser. No. 07/563,587, filed Aug. 6, 1990 abandoned.

TECHNICAL FIELD

The present invention relates to processes for forming longitudinally curved tooth gears and more particularly to processes which utilize a flared or dish-shaped tool for precision forming of curved tooth gears, such as spiral bevel and hypoid gears.

BACKGROUND OF THE INVENTION

For many years flared or dish-shaped grinding wheels have been utilized on gear grinding machines for finish grinding spiral bevel and hypoid gears. The grinding process comprises rotating a flared or dish-shaped grinding wheel about its axis while simultaneously oscillating the grinding wheel through an arc corresponding to the curvature of the desired longitudinal shape of the bevel or hypoid gear tooth. The primary advantage of this process is that sufficient clearance is provided to promote access of coolant between the grinding wheel and gear tooth resulting in the substantial elimination of overheating and damage to the tooth surfaces Detailed descriptions of this process can be found in the disclosures of U.S. Pat. No. 1,815,336 to Shlesinger et al. and U.S. Pat. No. 1,830,971 to Taylor.

According to known methods for grinding bevel or hypoid gear teeth, machines with flared or dish-shaped grinding wheels are used to simultaneously form-grind adjacent tooth sides of one member of a work gear pair, but the adjacent tooth sides of the other gear member are generated separately with a conventional cup-shaped grinding wheel. The separate treatment of the gear tooth sides in one member of a work gear pair has been required to appropriately mismatch the longitudinal tooth curvature of the form-ground member. Typically, a small amount of mismatch between mating tooth curves is desirable to permit some adjustment in the operating positions of the mating gears, however, the amount of mismatch associated with an attempt to simultaneously form adjacent gear teeth in both members of a mating gear by known methods, may greatly exceed desirable mismatch between mating tooth curves. Likewise, the formation of adjacent gear tooth sides of at least one member of a mating work gear pair in separate working steps or operations, as an alternative to simultaneously forming adjacent gear teeth in both members, is time consuming and may add considerable cost to the manufacture of the work gear pair.

Also according to known methods, longitudinal mismatch is provided between mating bevel and hypoid gear teeth by adjusting the radius of a cup-shaped grinding wheel, used to grind a tooth side in one member of a gear set, with respect to the radius of oscillation of a dish-shaped grinding wheel used to grind a mating tooth side of the other member of the pair. Longitudinal mismatch between mating tooth sides is determined by the difference between the respective radii of the cup-shaped grinding wheel and the arcuate path of oscillation of the dish-shaped grinding wheel. Thus, known mismatch between mating bevel and hypoid gear teeth may be represented as the separation between two arcs of different radii that are theoretically coincident at a single point. Under load, however, mating gear teeth tend to deform slightly and contact between the two surfaces spreads out over a portion of the tooth length.

One method of controlling the contact pattern between mating gear teeth is addressed in U.S. Pat. No. 1,982,050 to Gleason et al. wherein the grinding wheel follows a helical path as it moves across the face of a work gear. This helical motion is introduced by orienting the cup-shaped cutter axis perpendicular to the pitch line of the teeth and then adding motion along the cup-shaped cutter axis as the grinding wheel is oscillated through the curvature of a tooth. The helical motion maintains uniform inclinations between the active surfaces of the grinding wheel and the pitch surface of the gear and produces tooth profiles which control contact bias with mating gear tooth surfaces.

A method of controlling longitudinal mismatch is disclosed in U.S. Pat. No. 4,780,990 to Cody, Jr. et al. whereby motion along the cradle axis is added along with the oscillation of the grinding wheel about the cradle axis. The grinding wheel is reciprocated with respect to the work gear support along the cradle axis in a timed relationship with the oscillation of the grinding wheel and this timed relationship is controlled so that the rate of displacement of the work gear support changes with respect to the angular displacement of the grinding wheel about the cradle axis. This process, for example, enables the grinding wheel to be withdrawn at the ends of a tooth of a work gear to effectively control the radii of longitudinal tooth curvature of the work gear to appropriately mismatch the teeth of the work gear with the teeth of a mating member.

The above-described timed relationship may be further defined by a power series equation in which the displacement of the work gear is determined as a function of the angular displacement of the dish-shaped grinding wheel. Specific terms of the power series equation may be used to control relative machine motions to produce an improved form of mismatch between mating gear teeth. By controlling mismatch in such a manner, desirable contact characteristics are preserved between mating gear teeth over a wider range of loads and mounting adjustments.

However, there remains a need for motions in addition to the above-described motions along the cradle axis in order to more completely and precisely control the profile of gear teeth to thereby yield more accurate amounts and locations of desired mismatch and to enhance contact patterns between mating gear teeth.

SUMMARY OF THE INVENTION

Applicant has now discovered a plurality of motions each of which, when included in a timed relationship with the oscillating motion of a dish-shaped tool, such as a grinding wheel, define a controlled working path of the tool which modifies the shape of a gear tooth, for example a bevel or hypoid gear tooth, thus enabling the controlled formation of enhanced contact patterns of the gear teeth with the teeth of a mating gear.

The present invention comprises mounting a work gear and dish-shaped tool on respective work gear and tool supports. It should be noted that throughout the specification and claims the term "dish-shaped" tool is intended to include both dish-shaped cutting tools and dish-shaped grinding wheels including those grinding wheels known as "flared-cup" type tools. The dish-shaped tool is rotated about a tool axis passing substantially through the center thereof. The tool axis is inclined at an angle relative to the theoretical position of the axis of a cup-shaped cutter wherein the cup-shaped cutter axis is the theoretical axis of rotation of a cutting tool, for example a face mill cutter, that would be required to form cut the teeth of the work gear.

The rotating dish-shaped tool is oscillated with respect to the work gear with the oscillating being relative to the cup-shaped cutter axis. This oscillation causes the dish-shaped tool to swing through an arc corresponding to the desired longitudinal curvature of the gear tooth. The amount of arc is referred to as the cutter phase angle and is defined as the angular movement required by the dish-shaped tool about the cup-shaped cutter axis to sweep out the longitudinally curved tooth surface. The rotating and oscillating dish-shaped tool is brought into contact with the work gear teeth along a line extending top-to-flank on at least one side, usually both sides, of a tooth of the work gear with the line of contact and the cup-shaped cutter axis defining an instantaneous radial plane.

As the dish-shaped tool is oscillated about the cup-shaped cutter axis, additional controlled motions are added to variably position the dish-shaped tool with respect to the cup-shaped cutter axis. This variable positioning modifies the path of the dish-shaped tool and thereby changes the relative orientation between the line of contact and the work gear tooth. The variable positioning of the tool is in a timed relationship with the oscillating of the tool. The timed relationship is controlled to change the relative orientation between the line-of-contact and the gear tooth at any point along the oscillating path.

A first motion effects a change in pressure angle and is attained by pivoting the dish-shaped tool about a line extending perpendicular to the instantaneous radial plane at a point along the height of the tooth being worked. The pivoting is brought about by variably positioning the tool with respect to the cup-shaped cutter axis thus effecting a change in the relative angle between the dish-shaped tool axis and the cup-shaped cutter axis which corresponds to a change in the pressure angle.

A second motion is the pivoting of the dish-shaped tool about a radial line extending from the vicinity of the tip of the dish-shaped tool to the cup-shaped cutter axis with the radial line being substantially perpendicular to the cup-shaped cutter axis. The dish-shaped tool pivot point is in the vicinity of the tip of the tool in the tooth slot. This motion also effects a relative change in pressure angle.

A third motion comprises movement of the dish-shaped tool along the above-described radial line as the tool is oscillated. This linear motion effects removal of a greater amount of stock material from one side of a tooth than the other side of the tooth.

A fourth motion comprises movement of the dish-shaped tool along a line tangent to the lengthwise direction of a tooth at the line of contact. This motion effects removal of stock material, along the tangent line, from one side of a tooth surface while leaving a corresponding amount of stock material on the other side of the tooth. The above-described motions are all functions based upon the relative angular displacement of the oscillating the dish-shaped tool about the cup-shaped cutter axis. In addition to a single motion being included with the oscillating of the dish-shaped tool, any combination of the above-described motions may also be included.

The present invention also contemplates computer numeric control of at least the oscillating, contacting, variably positioning and controlling steps of the inventive process.

BRIEF DESCRIPTION OF THE DRAWINGS

FIGS. 5a, 5b, 5c and 5d illustrate contact patterns for the convex and concave sides of a tooth ground with no additional motions added to the oscillating motion of the grinding wheel.

FIGS. 9a, 9b, 9c and 9d represent contact patterns for the convex and concave sides of a gear tooth with a quadratic pressure angle change motion added to the oscillating motion of a dish-shaped grinding wheel.

FIG. 11 illustrates the effect of a quadratic pressure angle change motion on the concave side of a gear tooth.

FIG. 13 illustrates the effect of a cubic pressure angle change motion on the convex side of a gear tooth.

DETAILED DESCRIPTION OF THE INVENTION

The details of the invention will now be discussed with reference to preferred embodiments and the accompanying Drawing Figures which represent the invention by way of example only.

The present invention comprises a process which enables the oscillating motion of a dish shaped tool, for example a grinding wheel, to be modified in a manner by which additional controlled motions are included with the oscillating motion to define novel working paths of the dish-shaped tool.

The process of the present invention may be carried out on any machine capable of including additional motion with the oscillating motion of a dish-shaped tool. Mechanical machines may include a specially designed cam to introduce the added motion as is taught by previously discussed and commonly assigned U.S. Pat. No. 4,780,990 to Cody, Jr. et al. However, it is preferable to utilize machines such as that disclosed in PCT/US87/02083 filed Aug. 24, 1987 and published as WO 89/01838 on Mar. 9, 1989 for carrying out the present inventive process. The above-identified disclosure is the basis for and corresponds to commonly assigned U.S. Pat. No. 4,981,402, the disclosure of which is hereby incorporated by reference. This machine is of the type generally known as computer numerically controlled or CNC machines which comprise a plurality of axes along which movement of a grinding or cutting tool and a workpiece can be controlled in order to orient the tool and workpiece relative to one another in almost any position within the operational limits of the machine.

CNC systems for controlling movement of multiple machine axes along prescribed paths are now commonplace. Such state-of-the-art systems are incorporated in the present invention to control movements of selected axes along prescribed paths for orienting the dish-shaped tool with respect to a work gear.

Figure 1:
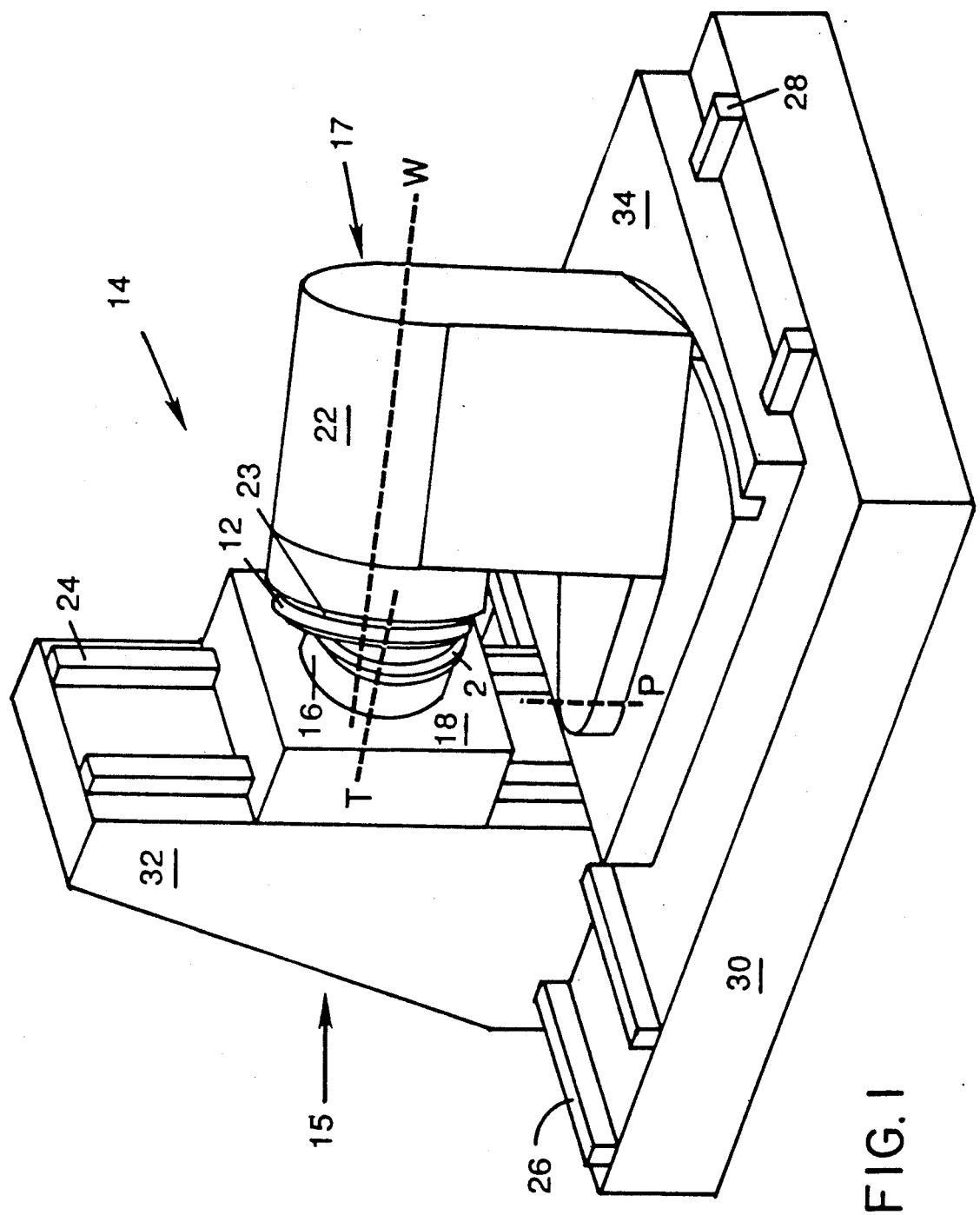
FIG. 1 schematically represents an apparatus for performing the process of the present invention.

A machine similar to previously mentioned U.S. Pat. No. 4,981,402 is shown in FIG. 1. The apparatus 14 comprises a tool support 15 for a dish-shaped tool 2, which in FIG. 1 is shown to be a dish-shaped grinding wheel. The dish-shaped grinding wheel 2 is releasably mounted to a tool spindle 16 which is in turn journaled for rotation in a tool head 18. Tool head 18 is capable of vertical movement (Y-axis) along ways 24 attached to carriage 32. Tool support 15 is capable of horizontal movement (X-axis) along ways 26 attached to machine base 30. Dish-shaped grinding wheel 2 is capable of rotary movement about its rotational axis T.

Apparatus 14 also comprises work support 17 wherein work gear 12 is releasably mounted to work spindle 23. Work spindle 23 is journaled for rotation in work head 22 and is capable of rotary movement about a longitudinal axis W. Work head 22 is mounted onto table 34 and is capable of angular (pivotal) movement about vertical axis P. It can be seen that the same relative angular or pivotal movement could be attained by having carriage 32 pivot about a vertical axis. Table 34 is capable of horizontal movement (Z-axis) along ways 28 attached to machine base 30.

Ways 24, 26 and 28 permit relative linear movement of the dish-shaped grinding wheel 2 and work gear 12 in three mutually orthogonal directions.

Movement of tool spindle 16, work spindle 23, work head 22, table 34, tool head 18 and carriage 32 is imparted by separate drive motors (not shown). The above-named components are capable of independent movement with respect to one another and may move simultaneously with one another. Each of the respective motors is associated with either a linear or rotary encoder (not shown) as part of a CNC system which governs the operation of the drive motors in accordance with instructions input to a computer (not shown). The encoders provide feedback information to the computer concerning the actual positions of each of the movable axes.

It can be clearly seen that by relative movement of the dish-shaped grinding wheel 2 and work gear 12 along any or all axes it is possible to orient the dish-shaped grinding wheel 2 and work gear 12 with respect to one another so that any area of the work gear 12 may be presented to the dish-shaped grinding wheel 2. Once presented, movement of the dish-shaped grinding wheel 2 and/or the work gear 12 is effected to cause the dish-shaped grinding wheel 2 to oscillate across the sides of the gear teeth incorporating any of the above-described additional motions as a function of the oscillating. The grinding path is directed by the computer, in response to input instructions, to control movements along respective axes in order to produce a desired surface on a tooth side.

Figure 2:
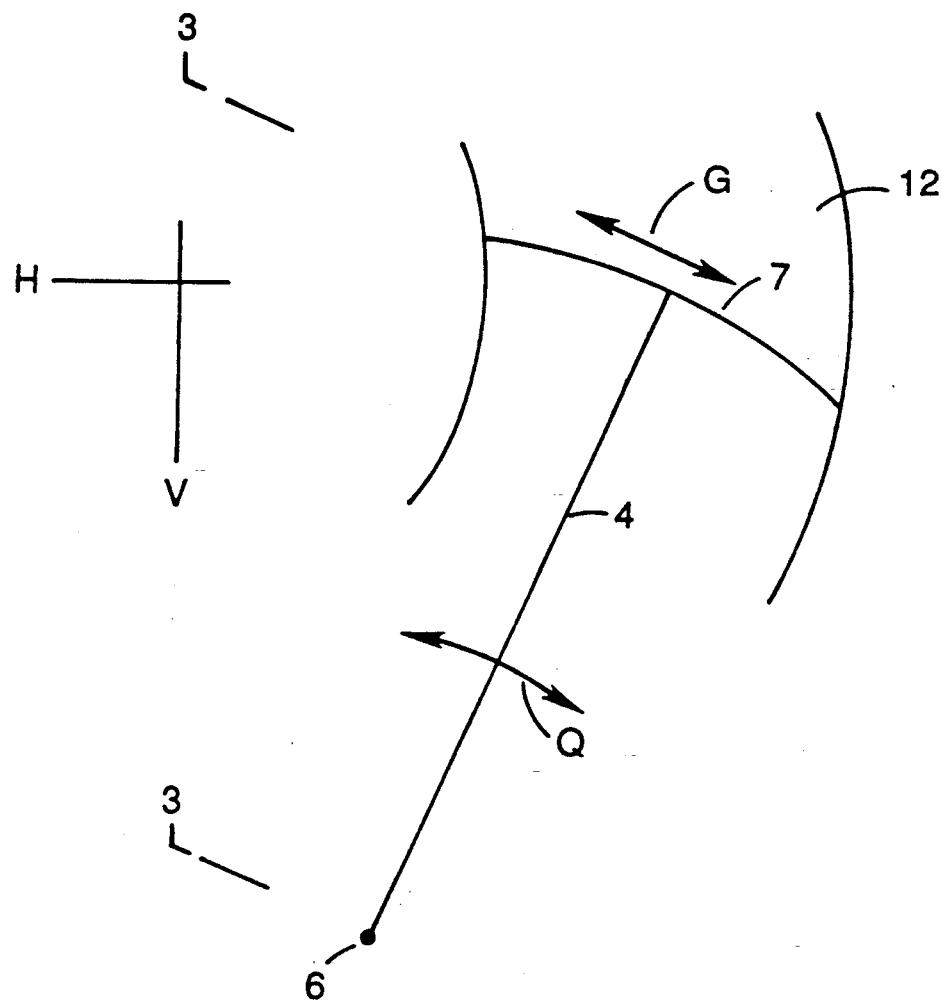
FIG. 2 illustrates the oscillating motion of a dish-shaped tool through the longitudinal curvature of a gear tooth.

FIG. 2 illustrates the oscillating path 7, corresponding to the longitudinal arcuate curvature of a gear tooth, of a flared or dish-shaped tool 2, such as a grinding wheel, as it travels through a phase angle Q across the sides of a tooth of gear 12. The phase angle Q is generally measured from the mid-point along the length of a tooth as shown by FIG. 2. The mid-point position is also referred to as the "zero position" for it is at this position that phase angle Q=0, measured usually in radians. Angular movement to one side of the zero position is assigned a negative (−) Q value and angular movement to the other side of the zero position is assigned a positive (+) Q value, also usually in radians. The letters H and V represent horizontal and vertical directional lines respectively and are utilized for non-limiting reference purposes only. The dish-shaped tool rotates about its axis 4 and the axis 4 is inclined to and oscillated through angle Q about the theoretical position of the axis 6 of a cup-shaped cutter. The cup-shaped cutter axis 6 is the theoretical axis of rotation of a cutting tool, for example a facemill cutter, that would be required to form cut the teeth of the work gear 12. Removing stock material from a work gear with a cup-shaped tool does not form part of the present invention. However, in order to adequately and correctly describe the axis position, oscillating and included inventive motions of the dish-shaped tool of the present invention, the theoretical position of the axis of a cup-shaped cutter which would be required form cut the teeth of the work gear must be referenced. A cup-shaped grinding wheel axis could also be utilized as a reference axis since the theoretical position of the cup-shaped grinding wheel axis would be substantially the same as the position of the axis of the cup-shaped cutter. A detailed description regarding the positions of a cup-shaped cutter axis and dish-shaped grinding wheel axis can be found in previously discussed and commonly assigned U.S. Pat. No. 1,830,971 to Taylor, the disclosure of which is hereby incorporated by reference.

Figure 3:
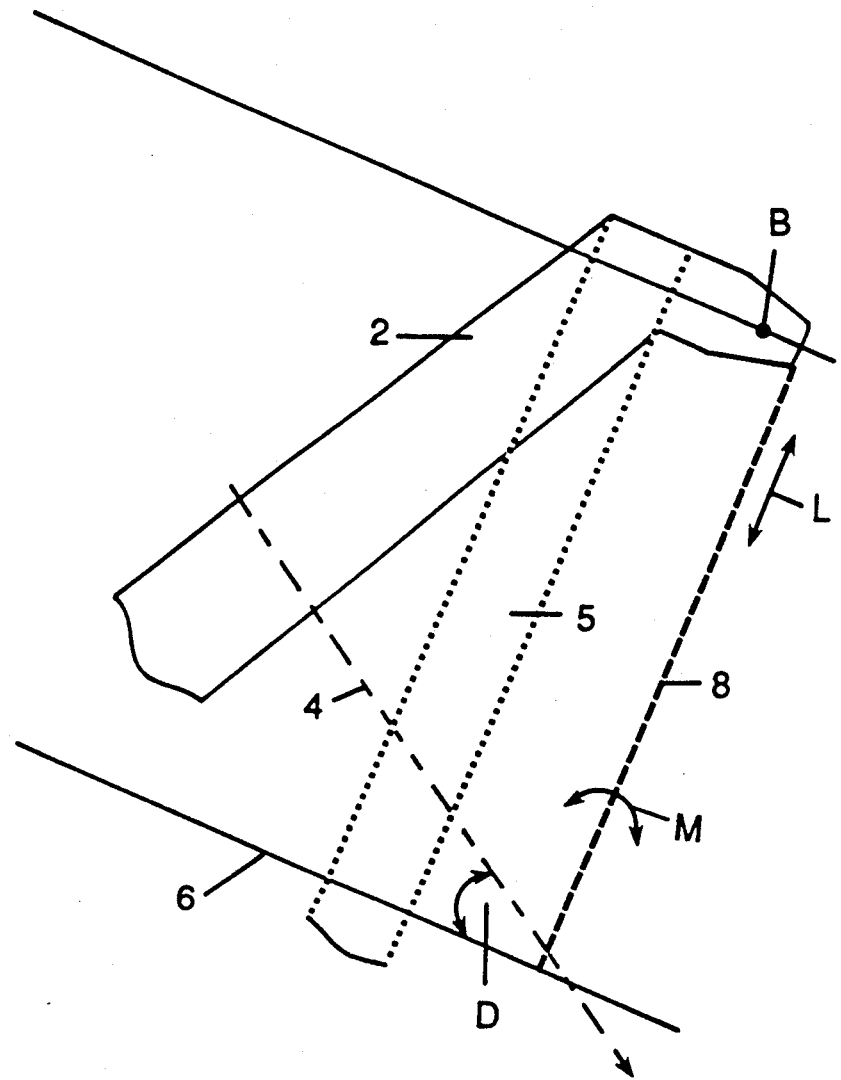
FIG. 3 shows the relationship of the operative position of a dish-shaped tool compared to a cup-shaped cutting tool.

FIG. 3 shows the relationship of the dish-shaped tool 2 and the theoretical position of a cup-shaped cutter 5 which would be required to form cut the teeth in work gear 12. It can be seen that dish-shaped tool axis 4 is inclined to cup-shaped cutter axis 6, this angular position enables the dish-shaped tool 2 to have line contact with the desired tooth sides of work gear 12. In the case of grinding, line contact has the advantage of allowing coolant into the tooth slot to prevent burning of the tooth, a problem which is found in grinding wheels that contact the tooth side along the entire length thereof. The line-of-contact and the cup-shaped cutter axis 6 form an instantaneous radial plane and an instantaneous radial line 8 is defined as extending from the vicinity of the tip of the dish-shaped tool 2 to the cup-shaped cutter axis 6 and being substantially perpendicular with the cup-shaped cutter axis 6. The instantaneous radial plane and line will be discussed below.

Figure 4:
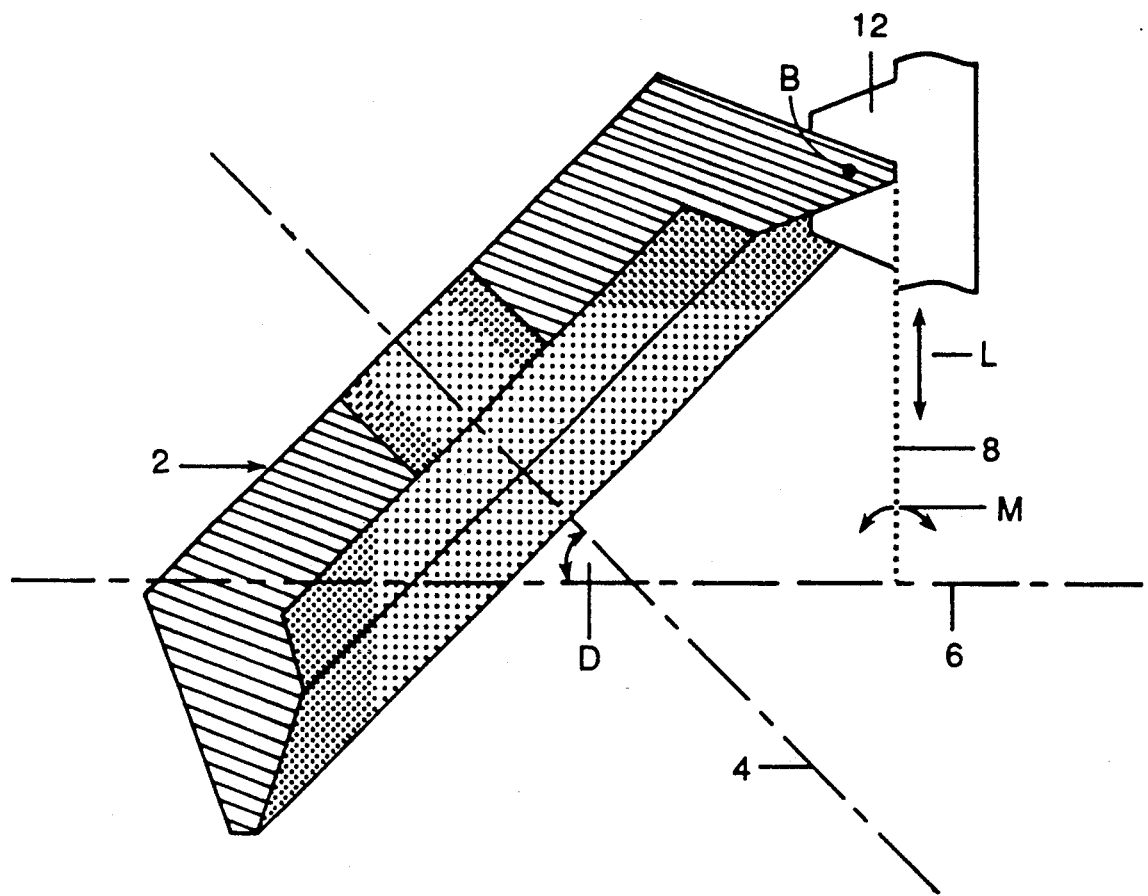
FIG. 4 illustrates a dish-shaped grinding wheel in engagement with a work gear.
Figure 6A:
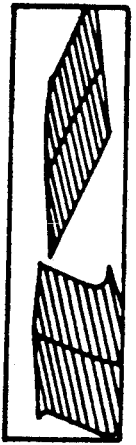
FIGS. 6a, 6b, 6c and 6d represent contact patterns for the convex and concave sides of a gear tooth with a linear pressure angle change motion added to the oscillating motion of a dish-shaped grinding wheel.
Figure 6C:
Figure 6B:
Figure 6D:
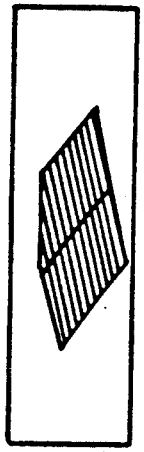

FIG. 4 illustrates a dish-shaped grinding wheel 2 in contact with adjacent tooth sides of a work gear 12. FIGS. 3 and 4 illustrate motions D, L and M along with Point B. These motions will also be discussed below.

The process of the present invention comprises modifying the working path of the dish-shaped tool as it oscillates across the surfaces of a work gear. These new dish-shaped tool motions enable more precise control of the amount and location of desired mismatch which in turn permits the enhanced control of contact patterns of the gear tooth with a mating gear. These novel motions will now be explained in detail.

With a CNC machine, any relative position between work gear and a tool is possible at any instant within the physical constraints of the process. A first constraint being that the direction and depth of the root line must be reasonably maintained along the entire length of the tooth. A second constraint is that an instantaneous relative curvature difference between the tooth surface and the tool must exist. Without it, secondary generation occurs. This curvature limitation is easily violated because the relative curvature difference between the tool and work gear are small. A third constraint relates to the required clearance between the tool and work gear at positions other than in the vicinity of their intended contact. For example, certain relative motions between the tool and the work gear that may be appropriate for generating one side of a tooth space may produce interference between the tool and the other side of the same tooth space.

With reference to FIGS. 5a–5d the contact patterns for the convex and concave sides of a tooth are shown. FIG. 5a shows contact patterns at the toe and heel ends of the convex tooth side and FIG. 5b shows the contact pattern at the centerline of the convex tooth side. FIG. 5c shows contact patterns for the heel and toe ends of the concave tooth side and FIG. 5d shows the contact pattern at the centerline of the concave tooth side. These patterns were produced by the conventional method of oscillating of a dish-shaped grinding wheel with no additional motion added to the oscillation. This motion will be referred to as a baseline motion. It is the basis to which other motions will be compared.

The inventive process will be illustrated with reference to grinding utilizing a dish-shaped grinding wheel, however, it is to be understood that the inventive motions are equally applicable to cutting utilizing a dish-shaped cutting tool.

The first motion which will be discussed effects a change in pressure angle as the dish-shaped grinding wheel oscillates through a phase angle Q across a tooth side. The motion comprises pivoting the dish-shaped grinding wheel about a line extending substantially perpendicular to the instantaneous radial plane. The line intersects the instantaneous radial plane at a point B (FIG. 3) along the tooth height, preferably at about mid-tooth height. The pivoting is effected by a change in the angle D between the dish-shaped grinding wheel axis 4 and the cup-shaped cutter axis 6. The change in angle D represents a change in the pressure angle. The angle D can be changed by any amount at any instant during the oscillation of the dish-shaped grinding wheel 2 through angle Q thereby changing the relative orientation between line-of-contact and the gear tooth. As dish-shaped grinding wheel 2 is oscillated about cup-shaped cutter axis 6 through angle Q, for example, the angle D between the cup-shaped cutter axis 6 and grinding wheel axis 4 can be changed thus causing the dish-shaped grinding wheel to pivot about point B and effect a change in the pressure angle.

The quantitative timed relationship between the oscillation of dish-shaped grinding wheel 2 across the face of work gear 12 with respect to the change of pressure angle D may be described mathematically by, among other methods, a power series equation for D in terms of Q:

$$D = A_1 x Q + A_2 x Q^2 + A_3 x Q^3 \ldots$$

wherein coefficients $A_1$ through $A_3$ etc. are selected to control the exact relationship between the respective motions of dish-shaped grinding wheel 2 and work gear 12. The ordered terms of the power series considered singularly or in combination define particular functions of D with respect to independent variable Q. The even ordered terms ($A_2 x Q^2$ etc.) each contribute to defining a family of "U" shaped functions. The first order term ($A_1 x Q$) defines a linear function while the remaining odd ordered terms ($A_3 x Q^3$, etc.) define a family of continuous "S" shaped functions.

Figure 7:
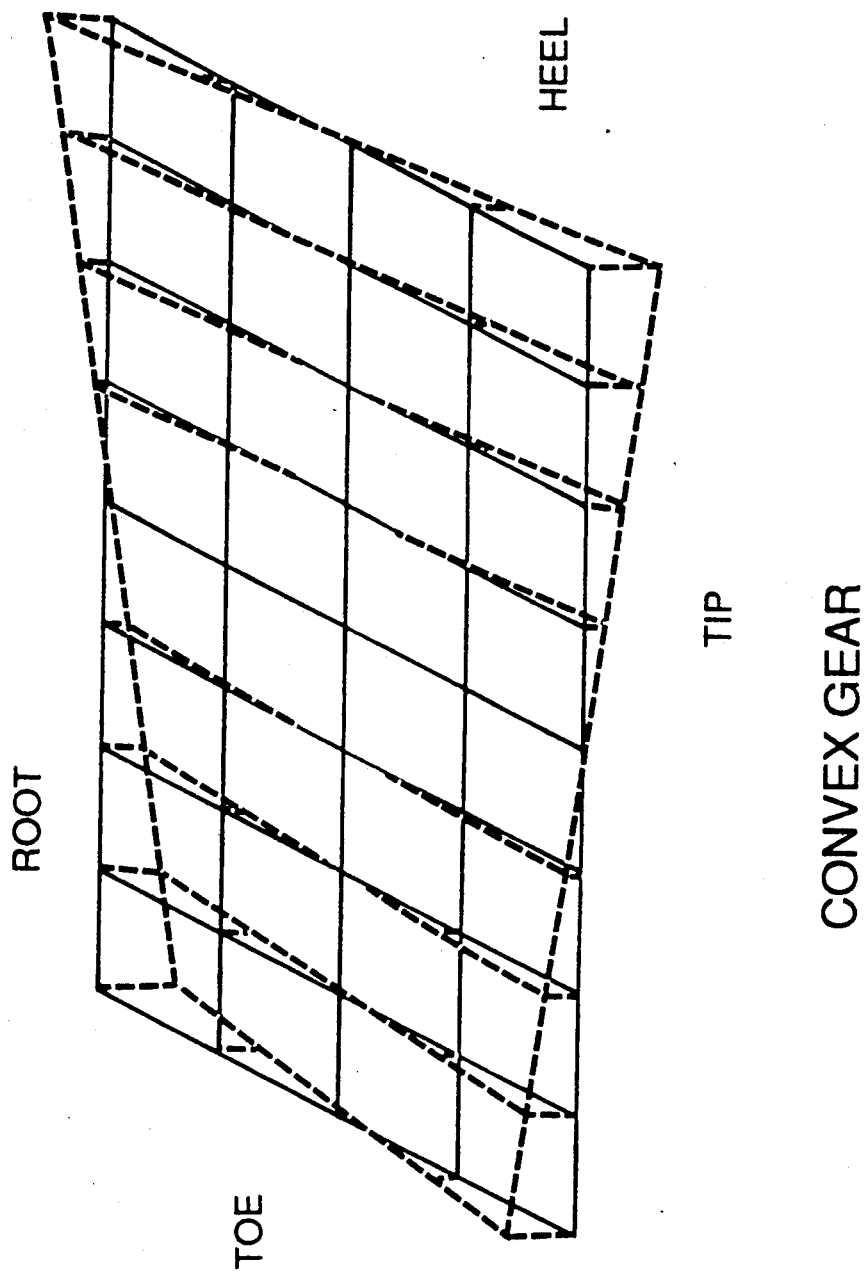
FIG. 7 illustrates the effect of a linear pressure angle change motion on the convex side of a gear tooth.
Figure 8:
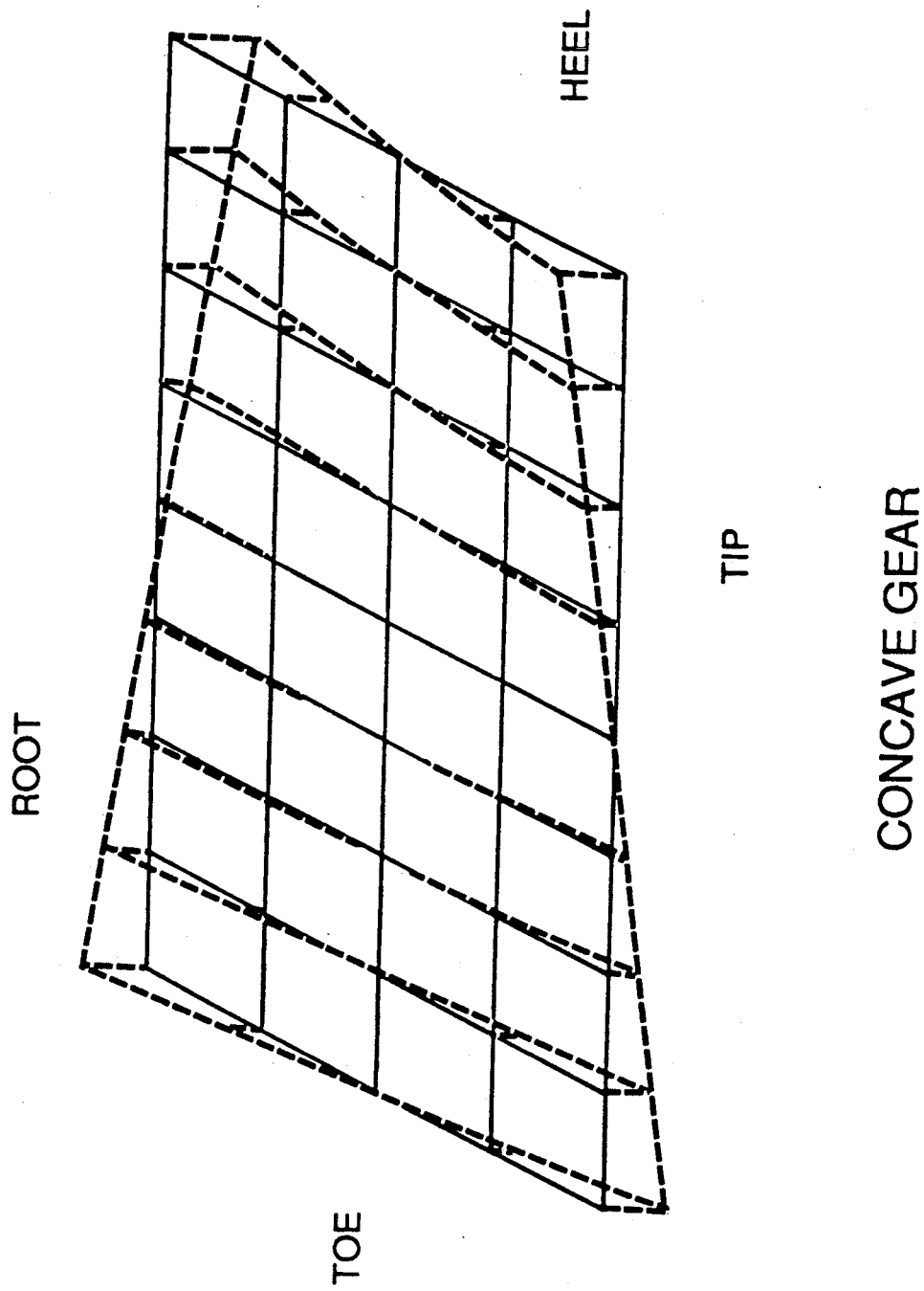
FIG. 8 illustrates the effect of a linear pressure angle change motion on the concave side of a gear tooth.

FIGS. 6, 7 and 8 illustrate the change from the baseline contact patterns and the change in the convex and concave surfaces of a gear tooth resulting from an $A_1$ value of 0.02 and a pivot point B selected at 0.2 inches from the tip of the grinding wheel 2. The values of $A_2$ and $A_3$ are set to 0.0. It can be seen from a comparison of FIGS. 6a–6d with baseline FIGS. 5a–5d that a bias change has resulted. The shape of the contact patterns having changed to predominantly toe to heel and top to flank on the convex side and heel to toe and top to flank on the concave side.

FIG. 7 schematically illustrates the change in surface topology for the convex side of a gear tooth. The solid lines represent the baseline surface and the dashed lines represent the surface resulting from the additional motion. It can be seen that a linear change ($A_1 x Q$) in the pressure angle has produced a second order surface leaving metal on at the toe end at the top and at the heel end of the flank while removing additional metal at the toe end of the flank and heel end of the top. The opposite effect takes place on the concave side of the gear tooth as shown schematically by FIG. 8, namely additional metal left on at the toe end of the flank and heel end of the top and additional metal removed at the toe end of the top and heel end of the flank.

The dish-shaped grinding wheel utilized in these examples include inner and outer stock removing surfaces at the periphery of the grinding wheel for simultaneously working the sides of adjacent gear teeth as it oscillates through a tooth slot. However, the motions contemplated by this invention may also be applied to grinding processes utilizing grinding wheels which contact at least one side of a gear tooth as it passes through a tooth slot. Included with these processes are grinding wheels that contact both sides of a tooth simultaneously or only one side of a tooth during oscillation across the tooth.

Figure 10:
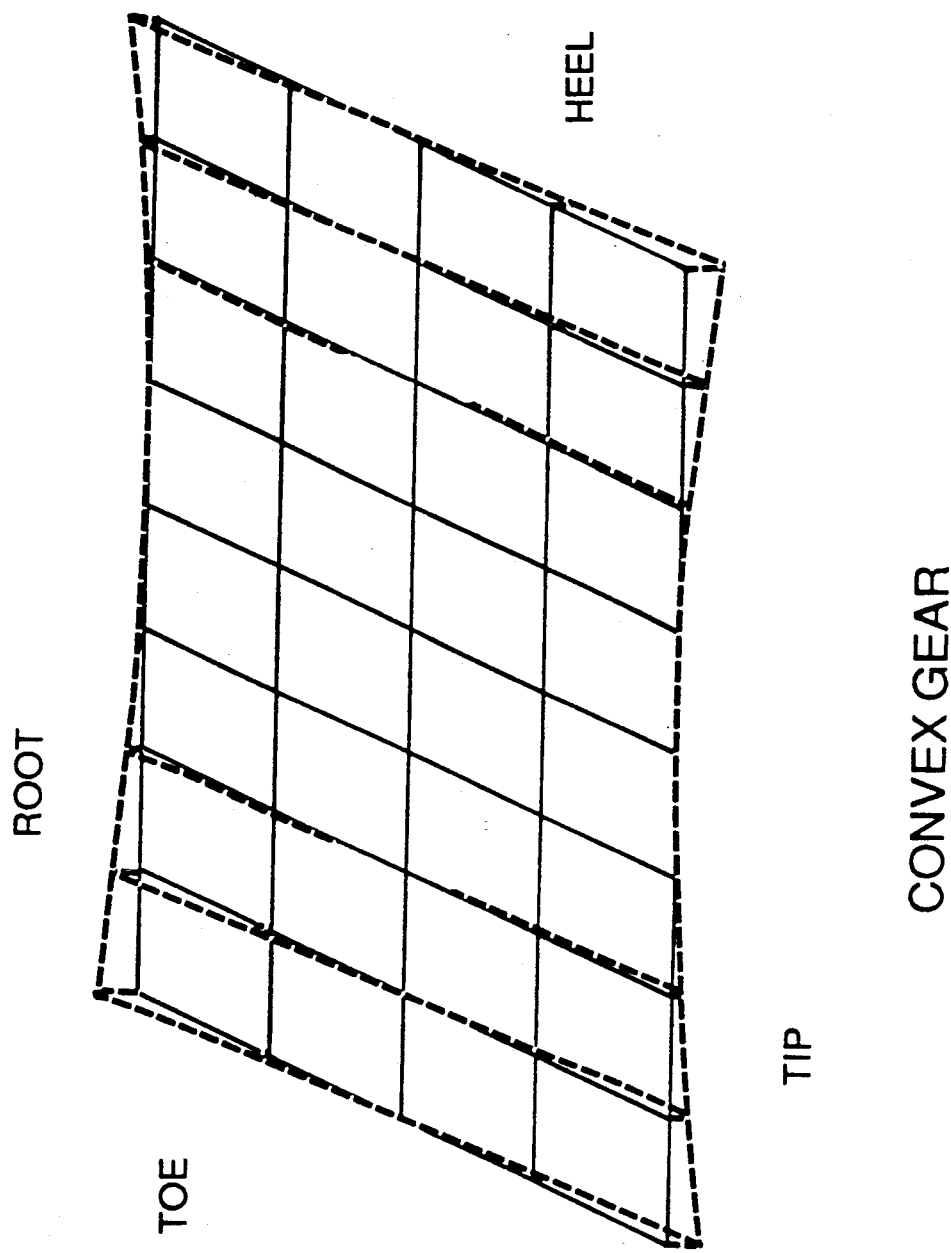
FIG. 10 illustrates the effect of a quadratic pressure angle change motion on the convex side of a gear tooth.

FIGS. 9, 10 and 11 illustrate the change in contact patterns and surface configurations brought about by setting the value of $A_2$ to 0.05 and the values of A and $A_3$ to 0.0 with the pivot point B remaining at 0.2 inches from the grinding wheel tip. From FIGS. 9a and 9c it can be seen that the shape of the convex side contact pattern has now changed, when compared to baseline FIGS. 5a and 5c, extending from an outward position at the flank at both the toe and heel ends to an inward position at the top at both toe and heel ends. The shape of the concave side contact pattern has also changed, extending from an outward position at the top at both the heel and toe ends to an inward position at the flank at both the heel and toe ends. These top to flank curvature changes are known as diamond changes.

FIG. 10 schematically illustrates a quadratic ($A_2 x Q^2$) pressure angle change in surface topology for the convex side of a gear tooth wherein a third order surface is formed. It is seen that additional metal has been removed from both the toe and heel ends at the top and additional metal has been left on at both the toe and heel ends at the flank. This change suggests that contact with a mating tooth surface should spread out toward the tooth center at the top and toward the tooth ends at the flank. Looking again at FIG. 9a it is shown that this is the case.

FIG. 11 schematically illustrates the change in surface topology of the concave side of a gear tooth. The opposite effects of FIG. 10 are shown, namely, additional metal left on at the top on both the toe and heel ends and additional metal removed at the flank at both the toe and heel ends.

FIGS. 10 and 11 show very little change at the center of the tooth sides indicating little expected contact pattern change at the centerline. FIGS. 9b and 9d verify this by showing little change when compared to baseline FIGS. 5b and 5d.

Figure 14:
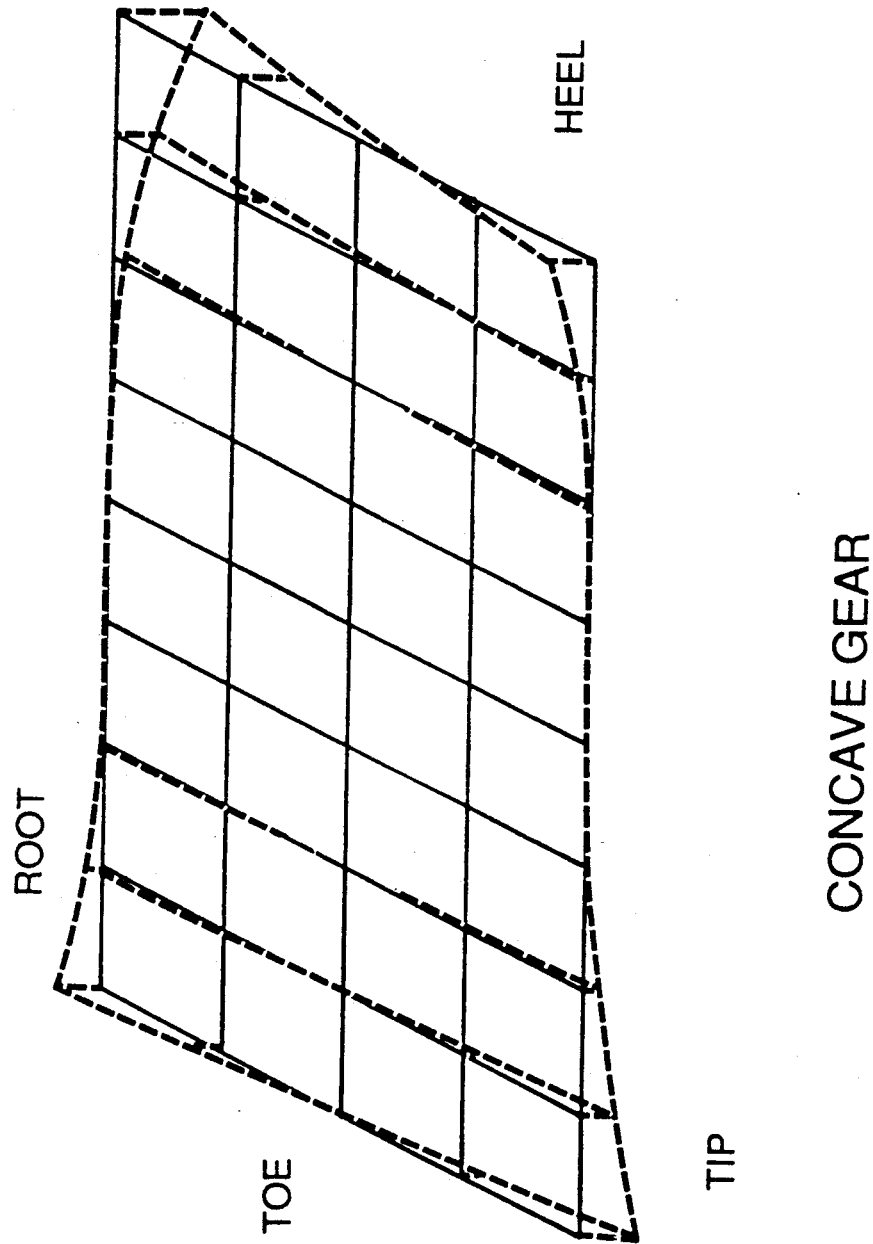
FIG. 14 illustrates the effect of a cubic pressure angle change motion on the concave side of a gear tooth.

FIGS. 12, 13 and 14 show the contact patterns and surface configuration changes resulting from a $A_3$ value 0.5 while $A_1$ and $A_2$ are set to 0.0. Again, point B is located at 0.2 inches from the grinding wheel tip. A cubically changing pressure angle ($A_3 x Q^3$) is observed with a fourth order surface formed at the corners of the teeth. FIG. 12a shows that the shape of the contact pattern for the convex side has changed, extending from an outward position at the top of the toe end to an inward position at the flank of the toe end when compared to baseline FIG. 5a. At the heel end, the shape of the contact pattern has changed, extending from an inward position at the top to an outward position at the flank. Contact for the concave side is shown in FIG. 12c where it can be seen that the shape of the contact pattern for the heel end has changed, extending from an outward position at the top to an inward position at the flank when compared to baseline FIG. 5c. Contact at the toe end of FIG. 12c shows a contact pattern shape change extending from an inward position at the top to an outward position at the flank.

FIGS. 13 and 14 schematically illustrate the change in surface topology for the convex and concave sides of a gear tooth wherein the cubically changing pressure angle ($A_3 x Q^3$) has been added to the oscillating of the dish-shaped grinding wheel. FIG. 13 shows that at the top, additional metal has been left on at the toe end and additional metal has been removed at the heel. At the flank, additional metal has been removed at the toe end and added at the heel end. FIG. 14 shows that at the top of the tooth, additional metal has been removed from the toe end and added at the heel end. At the flank of the tooth, additional metal has been added at the toe end and removed at the heel end.

Figure 12C:
FIGS. 12a, 12b, 12c and 12d represent contact patterns for the convex and concave sides of a gear tooth with a cubic pressure angle change motion added to the oscillating motion of a dish-shaped grinding wheel.
Figure 12D:
Figure 12A:
Figure 12B:

FIGS. 13 and 14 show little change at the centerline regions of the convex and concave sides which is also shown by a comparison of FIGS. 12b and 12d with baseline FIGS. 5b and 5d.

From the above discussion it can be clearly seen that with the process of the present invention, contact patterns between a gear tooth surface and its mating gear tooth surface can be precisely controlled. By assigning different values to the coefficients $A_1$, $A_2$, $A_3$, etc. the magnitude of change can be varied. It may also be appreciated that different terms of the power series may be used together to make specific contributions to the contact pattern of the gear teeth.

The steps of the inventive process may all be computer numerically controlled including at least the steps of oscillating of the grinding wheel, contacting the grinding wheel with the work gear, variably positioning the grinding wheel with respect to the cup-shaped cutter axis and controlling the timed relationship between the variable positioning and oscillating of the grinding wheel. However, mounting of the work gear on a work support and mounting of the dish-shaped grinding wheel on a tool support may be done manually.

A second motion that may be added to the oscillating motion of a dish-shaped grinding wheel is a rotational motion M about the instantaneous radial line 8 (FIGS. 3 and 4). As with the motion previously discussed, the primary effect of this motion is a change in the pressure angle along the length of the tooth. The edge of the grinding wheel twists relative to the root line of the tooth as the grinding wheel sweeps across the tooth. The pivot point should be at or near (in the vicinity of) the tip of the grinding wheel. To avoid secondary generation the trailing edge of the grinding wheel should tilt out of the work gear. The motion M can be described by the following polynomial based on the phase angle Q of the dish-shaped grinding wheel:

$$M = C_1 x Q + C_2 x Q^2 + C_3 x Q^3 + C_4 x Q^4 \ldots$$

wherein coefficients $C_1$ through $C_4$ etc. are selected to control the exact relationship between respective motions of the dish-shaped grinding wheel and the work gear 12.

The linear term ($C_1 x Q$) brings about a second order surface change in the form of a bias change. The cubic term ($C_3 x Q^3$) brings about a fourth order surface change effecting the ends of the teeth with the results being opposite at each end. As stated above, the trailing edge of the grinding wheel should tilt out of the work gear to avoid secondary generation. The linear and cubic terms of this particular motion present the risk of secondary generation due to the movement of the grinding wheel as it pivots about radial line 8 during the oscillation across a tooth surface. The values for these terms should accordingly be very small or even zero. Therefore, this motion is limited primarily to the quadratic ($C_2 x Q^2$) and/or quartic ($C_4 x Q^4$) terms which result in additional metal being taken off at the top on both sides of a tooth and at both ends of a side.

The quadratic term results in a contact pattern of "bias out" at the toe end of a tooth side and "bias in" at the heel end of a tooth side. The quartic term would have the same effect at the ends as the second order term except to a higher degree.

It is to be understood that although all terms of the polynomials have been shown to be positive (+), any or all terms may also be negative (−) with the effect of the associated motion being opposite that of the positive term.

A third motion that may be added to the oscillating motion of a dish-shaped grinding wheel is motion L along the instantaneous radial line 8 (FIGS. 3 and 4). This motion takes additional stock material off one side of a gear tooth and leaves additional stock on the other side. The motion L can be described by the following polynomial based on the phase angle Q of the dish-shaped grinding wheel:

$$L = R_1 x Q + R_2 x Q^2 + R_3 x Q^3 \ldots$$

wherein coefficients $R_1$ through $R_3$ etc. are selected to control the exact relationship between the dish-shaped grinding wheel 2 and the workpiece 12.

The linear term ($R_1xQ$) introduces a change in the spiral angle of the tooth and therefore is usually not used. This change is also limited by the above-described clearance constraint.

The quadratic term ($R_2xQ^2$) leaves additional metal on or takes additional metal off on both ends of a tooth side and does the opposite on the other side of the tooth. The effect of the quadratic term is the lengthening or shortening of the contact patterns depending upon the sign, positive or negative, of $R_2$. The quartic term ($R_4xQ^4$, if used) has the same effect as the second order term but to a higher degree.

The cubic term ($R_3xQ^3$) takes additional metal off at one end of a tooth side and leaves additional metal on at the other end of the tooth side while doing the opposite on the other tooth side. The effect of the cubic term is the lengthening of the toe and shortening of the heel or shortening of the toe and lengthening of the heel depending upon the sign, positive or negative, of $R_3$. Again, the effect is opposite on the two sides of the work gear tooth.

A fourth motion is linear motion G tangent to the lengthwise direction of tooth curvature (FIG. 2). Due to the curvature constraint this motion is very limited. The motion G can be described as a polynomial based on the phase angle Q of the dish-shaped grinding wheel:

$$G = S_1xQ + S_2xQ^2 + S_3xQ^3 \ldots$$

wherein coefficients $S_1$ through $S_3$ etc. are selected to control the exact relationship between the dish-shaped grinding wheel 2 and the workpiece 12.

The linear term ($S_1xQ$) introduces a spiral angle change to the tooth and is therefore usually not used.

The quadratic term ($S_2xQ^2$), depending upon the sign of $S_2$, lengthens or shortens the contact pattern with the effect being opposite on the two sides of the work gear tooth.

The cubic term ($S_3xQ^3$), depending upon the sign of $S_3$, has the effect of lengthening the toe and shortening the heel or shortening the toe and lengthening the heel. The effect is opposite on the two sides of the work gear tooth.

It can be clearly seen that by the process of the present invention the working path of a dish-shaped grinding wheel can be modified as it oscillates across the side of a work gear tooth. The disclosed motions enable a more precise control of the amount and location of desired mismatch which in turn enables more precise control of the amount and location of contact between the work gear teeth and the teeth of a mating gear.

As stated above, it is to be understood that the described inventive motions may also be equally applied to cutting processes utilizing a dish-shaped cutting tool.

It may also be appreciated that more than one motion may be included as the grinding wheel oscillates across a tooth side. Motions may be combined in order to produce a desired result requiring simultaneously contributed effects of a plurality of motions. It is also contemplated by the present invention that a plurality of motions may be included serially along a tooth length. For example, a pressure angle change motion D may be included with the oscillating of the grinding wheel on one side of the "zero position" along a tooth length and a tangential motion G may be included on the other side of the "zero position". Any combination of the disclosed motions is possible with the process of the present invention.

While the inventive process has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of forming the teeth of longitudinally curved tooth gears, said method comprising:
   mounting a work gear on a work support,
   mounting a dish-shaped tool on a tool support,
   rotating said dish-shaped tool about a tool axis passing substantially through the center of said dish-shaped tool, and wherein said tool axis is inclined at an angle relative to the theoretical position of the axis of a cup-shaped cutter, said cup-shaped cutter axis being the theoretical axis of rotation of a cutting tool that would be required to form cut said teeth of said work gear,
   oscillating said dish-shaped tool with respect to said work gear, said oscillating being relative to said cup-shaped cutter axis,
   contacting said work gear with said rotating and oscillating dish-shaped tool, said dish-shaped tool having top-to-flank line contact with at least one side of a tooth of said work gear, said line of contact and said cup-shaped cutter axis forming an instantaneous radial plane,
   variably positioning said dish-shaped tool with respect to said cup-shaped cutter axis by varying the relative angle of inclination between said tool axis and said cup-shaped cutter axis to effect a pivotal movement of said dish-shaped tool about a line extending along the height of a tooth of said work gear and in a direction substantially perpendicular to said instantaneous radial plane, said varying of said relative angle being in a timed relationship with said oscillating of said dish-shaped tool for defining a working path of said dish-shaped tool,
   controlling said timed relationship to effect a relative change in pressure angle with respect to the relative angular displacement of said oscillating of said dish-shaped tool about said cup-shaped cutter axis.

2. The method of claim 1 wherein at least the steps of oscillating, contacting, variably positioning and controlling are computer numerically controlled.

3. The method of claim 1 wherein said timed relationship is expressed as a power series.

4. The method of claim 3 wherein said power series is expressed as:

$$D = A_1xQ + A_2xQ^2 + A_3xQ^3 \ldots$$

wherein
   D = change in pressure angle
   Q = angle through which dish-shaped tool is oscillated
   $A_1$ through $A_3$ ... = coefficients selected to control the exact relationship between respective motions of dish-shaped tool and work gear.

5. The method of claim 1 wherein said dish-shaped tool comprises a dish-shaped grinding wheel.

6. The method of claim 5 wherein said dish-shaped grinding wheel includes inner and outer stock removing surfaces located at the periphery of the grinding wheel for simultaneously working sides of adjacent gear teeth.

7. The method of claim 5 wherein said dish-shaped grinding wheel contacts at least one side of a gear tooth during said oscillating.

8. The method of claim 1 wherein said dish-shaped tool comprises a dish-shaped cutting tool.

9. A method of forming the teeth of longitudinally curved gears, said method comprising:
mounting a work gear on a work support,
mounting a dish-shaped tool on a tool support,
rotating said dish-shaped tool about a tool axis passing substantially through the center of said dish-shaped tool and wherein said tool axis is inclined at an angle relative to the theoretical position of the axis of a cup-shaped cutter, said cup-shaped cutter axis being the theoretical axis of rotation of a cutting tool that would be required to form cut said teeth of said work gear,
oscillating said dish-shaped tool with respect to said work gear, said oscillating being relative to said cup-shaped cutter axis,
contacting said work gear with said rotating and oscillating dish-shaped tool, said dish-shaped tool having top-to-flank line contact with at least one side of a tooth of said work gear, said line of contact and said cup-shaped cutter axis forming an instantaneous radial plane,
variably positioning said dish-shaped tool with respect to a radial line extending from said cup-shaped cutter axis to said line of contact, said radial line being substantially perpendicular to said cup-shaped cutter axis, said variably positioning comprising rotating said tool axis about said radial line to effect a pivotal movement of said dish-shaped tool about a point located in the vicinity of the tip of said dish-shaped tool, said rotating being in a timed relationship with said oscillating of said dish-shaped tool to define a working path of said dish-shaped tool,
controlling said timed relationship to effect a relative change in pressure angle with respect to the relative angular displacement of said oscillating of said dish-shaped tool about said cup-shaped cutter axis.

10. The method of claim 9 wherein at least the steps of oscillating, contacting, variably positioning and controlling are computer numerically controlled.

11. The method of claim 9 wherein said timed relationship is expressed as a power series.

12. The method of claim 11 wherein said power series is expressed as:

$$M = C_1 x Q + C_2 x Q^2 + C_3 x Q^3 + C_4 x Q^4 \ldots$$

wherein
M = Amount of rotational motion about radial line
Q = Angle through which dish-shaped tool is oscillated
$C_1$ through $C_4$ ... = coefficients selected to control the exact relationship between respective motions of dish-shaped tool and work gear.

13. The method of claim 9 wherein said dish-shaped tool comprises a dish-shaped grinding wheel.

14. The method of claim 13 wherein said dish-shaped grinding wheel includes inner and outer stock removing surfaces located at the periphery of the grinding wheel for simultaneously working sides of adjacent teeth of said work gear.

15. The method of claim 13 wherein said dish-shaped grinding wheel contacts at least one side of a gear tooth during said oscillating.

16. The method of claim 9 wherein said dish-shaped tool comprises a dish-shaped cutting tool.

17. A method of forming the teeth of longitudinally curved tooth gears, said method comprising:
mounting a work gear on a work support,
mounting a dish-shaped tool on a tool support,
rotating said dish-shaped tool about a tool axis passing substantially through the center of said dish-shaped tool and wherein said tool axis is inclined at an angle relative to the theoretical position of the axis of a cup-shaped cutter, said cup-shaped cutter axis being the theoretical axis of rotation of a cutting tool that would be required to form cut said teeth of said work gear,
oscillating said dish-shaped tool with respect to said work gear, said oscillating being relative to said cup-shaped cutter axis,
contacting said work gear and said rotating and oscillating dish-shaped tool, said dish-shaped tool having top-to-flank contact with at least one side of a tooth of said work gear, said line of contact and said cup-shaped cutter axis forming an instantaneous radial plane,
variably positioning said dish-shaped tool with respect to a radial line extending from said cup-shaped cutter axis to said line of contact, said radial line being substantially perpendicular to said cup-shaped cutter axis, said positioning comprising varying the position of said dish-shaped tool along said radial line, said variably positioning along said radial line being in a timed relationship with said oscillating of said dish-shaped tool for defining a working path of said dish-shaped tool,
controlling said timed relationship to effect removal of a greater amount of stock material from one side of said teeth than from the other side of said teeth with respect to the relative angular displacement of said oscillating of said dish-shaped tool about said cup-shaped cutter axis.

18. The method of claim 17 wherein at least the steps of oscillating, contacting, variably positioning and controlling are computer numerically controlled.

19. The method of claim 17 wherein said timed relationship is expressed as a power series.

20. The method of claim 19 wherein said power series is expressed as:

$$L = R_1 x Q + R_2 x Q^2 + R_3 x Q^3 \ldots$$

wherein
L = amount of motion along radial line
Q = angle through which dish-shaped tool oscillates
$R_1$ through $R_3$ ... = coefficients selected to control the exact relationship between respective motions of dish-shaped tool and work gear.

21. The method of claim 17 wherein said dish-shaped tool comprises a dish-shaped grinding wheel.

22. The method of claim 21 wherein said dish-shaped grinding wheel includes inner and outer stock removing surfaces at the periphery of the grinding wheel for simultaneously working the sides of adjacent teeth of said work gear.

23. The method of claim 21 wherein said dish-shaped grinding wheel contacts at least one side of a gear tooth during said oscillating.

24. The method of claim 17 wherein said dish-shaped tool comprises a dish-shaped cutting tool.

25. A method of forming the teeth of longitudinally curved tooth gears, said method comprising:

mounting a work gear on a work support, mounting a dish-shaped tool on a tool support, rotating said dish-shaped tool about a tool axis passing substantially through the center of said dish-shaped tool, and wherein said tool axis is inclined at an angle relative to the theoretical position of the axis of a cup-shaped cutter, said cup-shaped cutter axis being the theoretical axis of rotation of a cutting tool that would be required to form cut said teeth of said work gear, oscillating said dish-shaped tool with respect to said work gear, said oscillating being relative to said cup-shaped cutter axis contacting said work gear with said rotating and oscillating dish-shaped tool, said dish-shaped tool having top-to-flank line contact with at least one side of a tooth of said work gear, with said line of contact and said cup-shaped cutter axis forming an instantaneous radial plane, variably positioning said dish-shaped tool with respect to a line tangent to the lengthwise direction of a tooth at said line of contact, said positioning comprising varying the position of said dish-shaped tool along said tangent line, said varying along said tangent line being in a timed relationship with said oscillating of said dish shaped tool for defining a working path of said dish-shaped tool, controlling said timed relationship to effect removal of an amount of stock material from one side of said teeth along said tangent line while causing substantially the same amount of stock material to be left on the other side of said teeth with respect to the relative angular displacement of said oscillating of said dish-shaped tool about said cup-shaped cutter axis.

26. The method of claim 25 wherein at least the steps of oscillating, contacting, variably positioning and controlling are computer numerically controlled.

27. The method of claim 25 wherein said timed relationship is expressed as a power series.

28. The method of claim 27 wherein said power series is expressed as:

$$G = S_1 x Q + S_2 x Q^2 + S_3 x Q^3 \ldots$$

wherein

G = amount of motion tangent to tooth length

Q = angle through which dish-shaped tool oscillates $S_1$ through $S_3$ ... = coefficients selected to control the exact relationship between respective motions of dish-shaped tool and work gear.

29. The method of claim 25 wherein said dish-shaped tool comprises a dish-shaped grinding wheel.

30. The method of claim 29 wherein said dish-shaped grinding wheel includes inner and outer stock removing surfaces at the periphery of the grinding wheel for simultaneously working sides of adjacent teeth of said work gear.

31. The method of claim 29 wherein said dish-shaped grinding wheel contacts at least one side of a gear tooth during said oscillating.

32. The method of claim 25 wherein said dish-shaped tool comprises a dish-shaped cutting tool.

* * * * *